United States Patent [19]

Lesar

[11] Patent Number: 4,823,936
[45] Date of Patent: Apr. 25, 1989

[54] DISCHARGE AUGER FOR A HOPPER OR THE LIKE

[75] Inventor: Nick J. Lesar, Palmyra, Wis.
[73] Assignee: Weiler & Co., Whitewater, Wis.
[21] Appl. No.: 109,187
[22] Filed: Oct. 15, 1987
[51] Int. Cl.[4] .............................................. B65G 69/06
[52] U.S. Cl. .................................... 198/550.1; 198/669
[58] Field of Search ............... 198/662, 669, 545, 548, 198/550.1, 550.4, 311, 533, 670, 671, 550.6; 406/55, 56, 59

[56] References Cited

U.S. PATENT DOCUMENTS

| | | | |
|---|---|---|---|
| 1,098,873 | 6/1914 | Allen | 198/669 |
| 1,750,310 | 3/1930 | Jonkel et al. | 198/669 |
| 2,390,680 | 12/1945 | Ausherman | 198/669 |
| 2,653,701 | 9/1953 | Heth | 198/669 |
| 3,244,271 | 4/1966 | Wenning | 198/9 |
| 3,901,483 | 8/1975 | Lasar | 259/41 |
| 4,363,571 | 12/1982 | Jackson et al. | 406/56 |
| 4,597,510 | 7/1986 | Durant | 198/669 |

Primary Examiner—Sherman D. Basinger
Assistant Examiner—Edwin L. Swinehart
Attorney, Agent, or Firm—Andrus, Sceales, Starke & Sawall

[57] ABSTRACT

A hopper for material such as meat or the like includes a material holding cavity having a substantially centrally located discharge opening. A rotatable shaft is provided in the bottom of the hopper. The shaft is provided with first and second end portions, each of which has spiraled flighting for moving material within the hopper in opposite directions toward the central discharge opening. A disruptor bar is disposed on the central portion of the shaft for intermittently disrupting the concentration of material adjacent the discharge opening and for forcing the material into the discharge opening.

5 Claims, 1 Drawing Sheet

DISCHARGE AUGER FOR A HOPPER OR THE LIKE

BACKGROUND AND SUMMARY

In this invention relates to an auger for moving material, and more particularly to an auger having spiraled flighting which moves material in opposite directions.

In handling materials which are somewhat dense and sticky, such as meat or meat trimmings or the like, unique problems are encountered in discharging such materials from a hopper into a discharge opening in the bottom of the hopper. It is known to use a generally V-shaped hopper having a trough at its bottom, with a conveyor disposed in the trough for moving the materials toward a discharge opening provided adjacent one end of the trough. The discharge opening leads to an unloading mechanism, such as a screw conveyor disposed below the trough, to convey the materials to a downstream station for processing. In such a structure, the auger in the trough of the hopper moves the material from one end of the trough to another, at which time the materials flow by gravity into the discharge opening. However, with some sticky and dense materials, the materials can form a "bridge" over the auger. In this event, the auger rotates beneath the "bridge" without delivering any material to the discharge opening.

Another shortcoming of the described system is the excessive "piling up" of materials at the end of the trough adjacent the discharge opening. With some materials, such "piling up" of materials can lead to spillage of some material over the top of the hopper.

An attempt to solve the above-described problems has involved providing intermittent reversal of the discharge auger. This action dislodges the bridged material and causes it to enter the discharge opening, and also reduces the potential for materials to spill over the side of the hopper adjacent the discharge opening. However, such intermittent reversal requires the presence of an operator to monitor the unloading of the hopper, and also slows the unloading process.

Further, in the above-described system, substantial amounts of stress occur in the side walls of the hopper due to the materials being forced against the side of the hopper by the auger. Consequently, it is necessary to reinforce the hopper sides to adequately withstand such stress.

The present invention is designed to address the above-mentioned problems. In accordance with the invention, an auger is provided for discharging material such as meat or the like from a hopper. The hopper has a material holding cavity, including a trough, and a discharge opening in the bottom of the cavity adjacent the center of the trough. The discharge auger includes a rotatable shaft having a first end portion and a second end portion, each of which is provided with a spiraled flighting. In response to rotation of the shaft, the flighting moves the material within the hopper in opposite directions toward the discharge opening in the center of the trough. This movement of the materials creates a concentration of material adjacent the discharge opening. The auger is further provided with disruptor means disposed on the shaft adjacent the discharge opening for intermittently disrupting the concentration of material adjacent the discharge opening. The disruptor means also forces the material into the discharge opening for discharging the material from the cavity of the hopper. In one embodiment, the shaft is provided with a central portion etween the first and second end portions, having a reduced transverse dimension relative to the transverse dimension of the end portions. The central portion of the shaft is provided with a disruptor bar adjacent the discharger opening. The disruptor bar rotates in response to rotation of the shaft, and intermittently passes through the concentration of material adjacent the discharge opening, to dislodge any "jamming" of material and to force material into the discharge opening.

BRIEF DESCRIPTION OF THE DRAWINGS

The drawings illustrate the best mode presently contemplated of carrying out the invention.

In the drawings.

DETAILED DESCRIPTION

Figure 1:
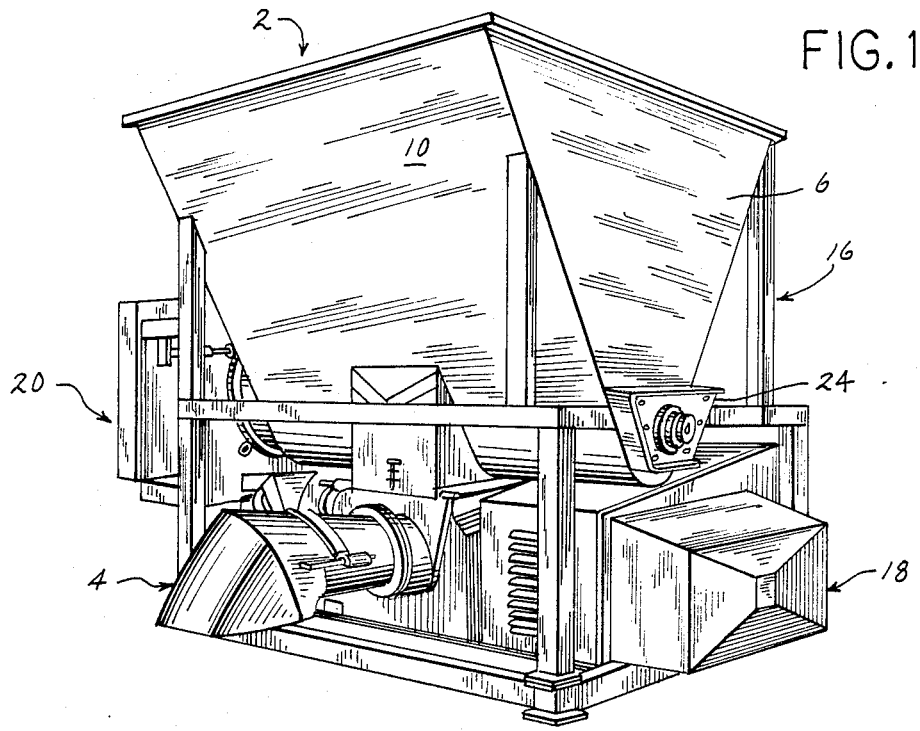
FIG. 1 is an isometric view of a hopper provided with an auger constructed according to the present invention, with a meat grinder disposed below the hopper.
Figure 2:
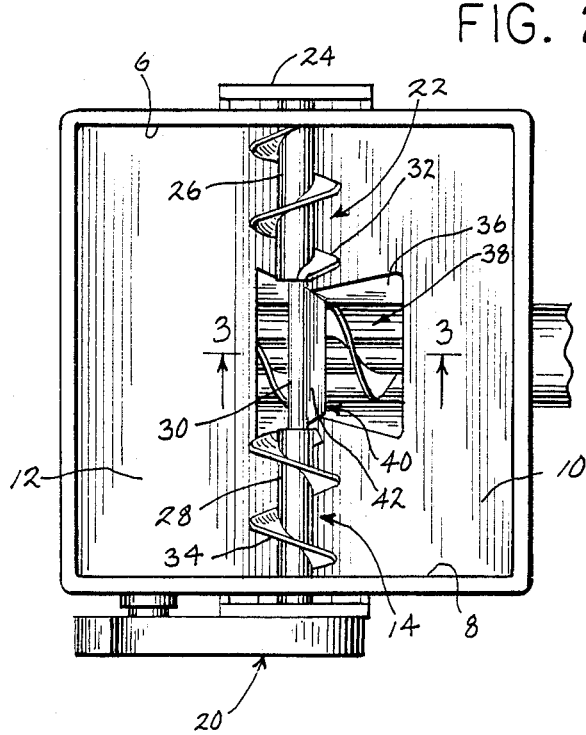
FIG. 2 is top plan view looking down on the hopper of FIG. 1, showing the auger constructed according to the invention.

Referring to FIGS. 1 and 2, a hopper 2 is shown with a meat grinder unit 4 disposed therebelow. Hopper 2 is adapted to receive materials such as meat or the like. Hopper 2 is substantially V-shaped in cross section, having triangular end walls 6, 8, with sloped side walls 10 and 12 extending therebetween. The appex of the V-shaped hopper 2 forms a trough 14. Trough 14 receives meat or other materials placed within hopper 2, which are forced downwardly toward trough 14 by gravity.

A supporting structure 16 is provided for supporting hopper 2 and grinder unit 4. A drive mechanism 18 is provided for grinder unit 4, and a drive mechanism 20 is provided for hopper 2.

As best seen in FIG. 2, a shaft 22 is provided in trough 14 extending between ends 6 and 8 of hopper 2. Shaft 22 extends through end walls 6 and 8, and is connected at one end to a bearing assembly 24 and at the other end to drive mechanism 20, both of which are supported by support structure 16.

Shaft 22 has a first end portion 26 and a second end portion 28, with a central portion 30 disposed therebetween. End portions 26 and 28 are substantially cylindrical, as is central portion 30. Central portion 30 has a reduced diameter relative to the diameters of end portions 26 and 28.

End portions 26 and 28 of shaft 22 are provided with spiraled flighting 32 and 34, respectively. As can be seen, spiraled flighting 32 and 34 are oppositely threaded. In this manner, when shaft 22 is rotated, materials in trough 14 are moved in opposite directions. The present invention contemplates rotation of shaft 22 so that spiraled flighting portions 32 and 34 move material toward a central discharged opening 36 provided adjacent trough 14.

Figure 3:
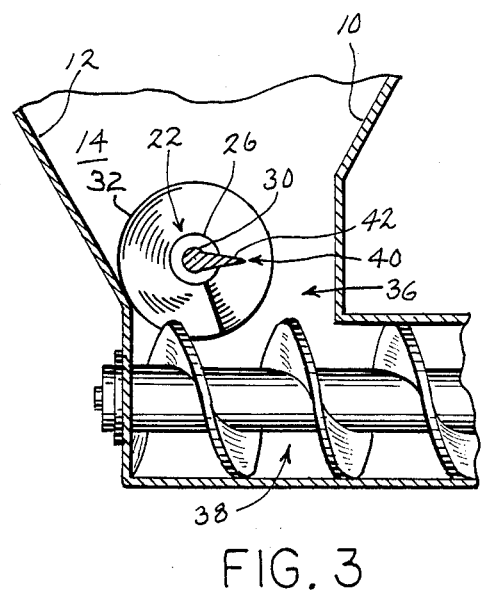
FIG. 3 is a sectional view taken generally along line 3—3 of FIG. 2.

As shown in FIGS. 2 and 3, a screw conveyor 38 is provided below central discharge opening 36. Screw conveyor 38 conveys materials away from hopper 2 after such materials have passed through discharge opening 36. As shown in FIG. 1, screw conveyor 38 conveys the materials, such as meat or the like, away from hopper 2 toward a grinder unit 4. Grinder unit 4 is a meat grinder o processor which grinds or processes the meat materials, as is well known.

Referring now to FIGS. 2 and 3, reduced central portion 30 of shaft 22 is provided with a disruptor bar 40 connected thereto. Disruptor bar 40 has a cross section in the shape of an isosceles triangle, with the equal sides of the triangle pointing outwardly away from central portion 30 and the third side of the triangle connected to central portion 30. Disruptor bar 40 is an elongated member, extending substantially along the entire length of reduced central portion 30 of shaft 22. One side of the triangular cross section of disruptor bar 40 comprises a substantially flat surface 42 which, in response to rotation of shaft 22, intermittently contacts and disrupts the concentration of materials formed adjacent discharge opening 36 by the action of oppositely disposed spiraled flighting portions 32 and 34. This action of disruptor bar 40 dislodges and prevents jamming of materials adjacent discharge opening 36. The described operation of disruptor bar 40 also forces materials downwardly into discharge opening 36. In this manner, disruptor bar 40 ensures a constant supply of materials to output conveyor 38 through discharge opening 36.

As seen in FIG. 3, disruptor bar 40 projects radially outwardly from central portion 30 of shaft 22. As can also be seen in FIG. 3, a longitudinal axis passing through the geometric center of disruptor bar 40 is offset from the longitudinal axis of shaft 22.

In operation, meat products or the like are placed within the material holding cavity of hopper 2. Drive mechanism 20 is then actuated for rotating shaft 22, and drive mechanism 18 is actuated for rotating discharge screw conveyor 38. In response to rotation of shaft 22, meat materials are forced by spiraled flighting portions 32 and 34 toward the center of the trough 14. This forms a concentration of materials adjacent discharge opening 36 provided in the bottom of hopper 2 adjacent trough 14. Such concentration of meat products in this area ensures that, as long as meat materials remain within the material-holding cavity of hopper 2, a constant supply of such materials will be available for passage through discharge opening 36 to output screw conveyor 38. Rotation of disruptor bar 40 eliminates any jamming which would prevent meat materials from passing into discharge opening 36, and ensures that the meat materials will be available for gravity flow into discharge opening 36. Furthermore, disruptor bar 40 tends to force meat materials into discharge opening 36 from the concentration of materials adjacent thereto, and to pass into the flighting of output screw conveyor 38.

The present invention thus provides a smoothly operating discharge mechanism for a hopper. It is preferable that the drive mechanisms for shaft 22 and for output screw conveyor 38 be variable speed, so that the components can be rotated according to the output demands of the processing equipment downstream of hopper 2.

It should be understood that, while the invention is shown in connection with a grinder unit, the invention is usable in connection with any processing equipment. For example, an exemplary use of hopper 2 is as the first receiving point in a meat processing line, which includes a series of conveyors, mixers and grinders. In such an application, screw conveyor 38 simply transfers the meat materials downstream at a predetermined flow rate to processing equipment.

In this application, screw conveyor 38 is generally inclined at an angle so as to discharge the materials over the top of a hopper or the like located downstream of hopper 2.

It is understood that various alternatives and modifications are contemplated as being within the scope of the following claims particularly pointing out and distinctly claiming the invention.

I claim:

1. An auger for discharging materials such as meat or the like from a hopper having a material holding cavity and a trough with a discharge opening located adjacent to a bottom portion of said cavity, said auger comprising:

a rotatable shaft located adjacent said discharge opening, said shaft having a first end portion and a second end portion and a central portion disposed therebetween, wherein the transverse dimension of said central portion of said shaft is reduced relative to the transverse dimension of said first and second end portions, each of said end portions including spiraled flighting for moving said material in opposite directions toward said discharge opening in response to rotation of said shaft to create a concentration of said material adjacent said discharge opening; and disruptor means disposed on said central portion of said shaft and located adjacent said discharge opening for intermittently disrupting the concentration of material adjacent said discharge opening and for forcing said material into said discharge opening in responser to rotation of said shaft for discharging said material from said cavity through said discharge opening.

2. An auger for discharging materials such as meat or the like from a hopper having a material holding cavity and a trough with a discharge opening located adjacent to a bottom portion of said cavity, said auger comprising:

a rotatable shaft located adjacent said dicharge opening, said shaft having a first end portion and a second end portion and a central portion disposed therebetween, each of said end portions including spiraled flighting for moving said material in opposite directions twoard said discharge opening in response to rotation of said shaft to create a concentration of said material adjacent said discharge opening; and disruptor means disposed on the central portion of said shaft and located adjacent said discharge opening for intermittently disrupting the concentration of material adjacent said discharge opening and for forcing said material into said discharge opening in response to rotation of said shaft for discharging said material from said cavity through said discharge opening, said disruptor means being disposed on said shaft so that a longitudinal axis through the geometric center of said disruptor means is offset from the longitudinal axis of said shaft, and wherein said disruptor means comprises a disruptor member having a generally triangular cross section, with one side of said disruptor member being connected to said shaft along the length of said disruptor member.

3. The invention according to claim 2, wherein the cross section of said disruptor member is substantially in the shape of an isosceles triangle, with the unequal side of said triangular cross section being connected to said shaft along the length of said disruptor member.

4. An apparatus for providing a flow of material such as meat or the like to a downstram station, comprising:
   a hopper having a material holding cavity with a centrally disposed discharge opening through which material passes from said material holding cavity; and
   a rotatable shaft having a first end portion and a second end portion and a central portion disposed therebetween, with the transverse dimension of the central portion of said shaft being reduced relative to the transverse dimension of said first and second end portions, said shaft being located adjacent the bottom of said material holding cavity, each said end portion being provided with spiraled flighting for moving said material in opposite directions toward said discharge opening in response to rotation of said shaft to thereby create a concentration of said material adjacent said discharge opening, and disruptor means disposed on the central portion of said shaft and located adjacent said discharge opening for intermittently disrupting the concentration of material adjacent said discharge opening and for forcing said material into said discharge opening in response to rotation of said shaft for discharging said material from said cavity.

5. An apparatus for providing a flow of material such as meat or the like to a downstream station, comprising:
   a hopper having a material holding cavity with a centrally disposed discharge opening through which material passes from said material holding cavity; and
   a rotatable shaft having a first end portion and a second end portion and a central portion disposed therebetween, said shaft being located adjacent the bottom of said material holding cavity, each said end portion being provided with spiraled flighting for moving said material in opposite directions toward said discharge opening in response to rotation of said shaft to thereby create a concentration of said material adjacent said discharge opening, and disruptor means disposed on the central portion of said shaft and located adjacent said discharge opening for intermittently disrupting the concentration of material adjacent said discharge opening and for forcing said material into said discharge opening in response to rotation of said shaft for discharging said material from said cavity, said disruptor means being disposed on said shaft so that a longitudinal axis through the geometric center of said disruptor means is offset from the longitudinal axis of said shaft, and wherein said disruptor means comprises a disruptor member having a generally triangular cross section, with one side of said disruptor member being connected to said shaft along the length of said disruptor member.

* * * * *

UNITED STATES PATENT AND TRADEMARK OFFICE
CERTIFICATE OF CORRECTION

PATENT NO. : 4,823,936
DATED : April 25, 1989
INVENTOR(S) : Nick J. Lesar

It is certified that error appears in the above-identified patent and that said Letters Patent is hereby corrected as shown below:

IN THE CLAIMS:

Column 4, Line 46, Claim 2, delete "twoard" and substitute therefore -- toward --; Column 5, Line 4, Claim 4, delete "downstram" and substitute therefore -- downstream --.

Signed and Sealed this

Twenty-fifth Day of September, 1990

Attest:

HARRY F. MANBECK, JR.

Attesting Officer     Commissioner of Patents and Trademarks